Patented Apr. 26, 1949

2,468,516

UNITED STATES PATENT OFFICE 2,468,516

LUBRICANTS

Raphael Rosen, Elizabeth, and William J. Sparks, Westfield, N. J., assignors to Standard Oil Development Company, a corporation of Delaware No Drawing. Application August 11, 1945, Serial No. 610,392

2 Claims. (Cl. 252—58)

This invention relates to the preparation of lubricating compositions having special properties. More specifically, it concerns the production of superior lubricating compositions containing chlorinated high molecular weight synthetic organic compounds of a special type.

Broadly, this invention comprises the use of chlorinated polymers having a high molecular weight, i. e. about 2,000 to 200,000 or more, which are obtained by polymerization of certain oxygen-containing compounds of the vinyl ether class for improving the viscosity-index pour point and anti-friction properties, as well as other properties, of lubricants. These chlorinated linear polymers should contain about 1 to 25% of chlorine. For improving viscosity index (V. I.) the range of 1 to 10% chlorine is preferred, while about 2 to 5% usually gives the best results; larger amounts of 10 to 25% are not as advantageous for V. I. but give excellent pour depressing properties. The exact amount of chlorine which they should contain depends to some extent upon the nature of the unchlorinated polymer and upon the properties desired in the chlorinated product. In this regard, it should be observed that the solubility of these high molecular weight, oxygen-containing compounds in hydrocarbon lubricating oil base stocks usually increases or is modified markedly when chlorination is begun, and that there is a certain chlorine content at which the high molecular weight compound possesses optimum mineral oil solubility-relationship for V. I. improvement of lube oils. When chlorination is continued beyond that point, the oil solubility of the high molecular weight compounds decreases until a point is eventually reached where the chlorinated derivative is substantially insoluble in mineral lubricating oils. The exact chlorine content or range of chlorine contents required for optimum solubility of the high molecular weight compounds in lubricating oils varies according to the nature of the high molecular weight polymerized vinyl ether being chlorinated and, to some extent, with the nature of the lubricating oil base stock in which the chlorinated compound is to be incorporated, as such compounds are generally somewhat more soluble in naphthenic and mixed base lubricating oils than in a highly paraffinic oil.

The preferred new lubricating oil addition agents are chlorine derivatives of polymers of vinyl ethers having the general formula,

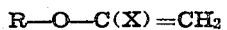

$$R-O-C(X)=CH_2$$

in which R is an unsubstituted or substituted aliphatic, aromatic, or hydroaromatic group containing at least 4, and preferably at about 8 carbon atoms, and X is an H or a halogen atom, or a $CH_3$ or $C_2H_5$ group, e. g. vinyl oleyl ether, vinyl isobutenyl ether, vinyl meta-cresyl ether, vinyl cyclohexyl ether, vinyl octadecyl ether, vinyl chloroethyl ether, vinyl amino propyl ether $\alpha$-ethylvinyl isohexyl ether, $\alpha$-chloromethyl vinyl lauryl ether, etc., especially such polyacrylic ethers having a molecular weight of 2,000 to 50,000. These polymers are very different from polyacrylates which contain twice as much oxygen, and from products made by first polymerizing acrylic acid and then esterifying the resultant polyacrylic acid, because it is substantially impossible to completely esterify a high molecular weight polyacrylic acid, so the final product always contains some acid groups which make the product difficult or impossible to dissolve in lubricating oils.

It is preferred to use chlorine instead of other halogenating agents because it produces more effective lubricating oil additives, and is not as destructively reactive as fluorine.

The chlorinated derivatives of this invention may be prepared by chlorination of preferred vinyl ether polymers according to known methods, such as by passing chlorine gas into a solution of the polymer in a suitable chlorine-inert solvent, e. g. chlorinated hydrocarbon solvent, such as carbon tetrachloride, chloroform, etc., with or without the use of a chemical catalyst or actinic light rays, such as sunlight, ultraviolet light, etc. The progress of the chlorination may be determined readily by analysis of periodic samples of the chlorination product, or may be judged approximately by the relative increase in specific gravity of the reaction mixture. In this connection, it should be noted, although chlorination of high molecular weight organic compounds of almost any type causes some molecular breakdown (as evidenced by a reduction in the molecular weight of the organic compound in the course of the chlorination reaction) there is relatively much less molecular breakdown upon chlorination of the preferred vinyl ether polymers discussed above than is the case when linear, aliphatic hydrocarbon polymers, such as rubber, polyisobutylene, etc., are chlorinated; thus, the relative change in viscosity of the reaction mixture is not a very good indication of the degree of chlorination of the polymer.

After the desired degree of chlorination has been effected, the resultant chlorinated vinyl ether polymer is recovered from the solution by any suitable means. One method is to blow the solution with an inert gas such as nitrogen or carbon dioxide to remove any residual dissolved chlorine, and then remove the solvent by evaporation, preferably under vacuum to prevent any possible decomposition. However, a preferred recovery method is to add to the solution a precipitating agent such as a lower alcohol, e. g. ethyl alcohol, methanol, isopropyl alcohol and the like, or other low molecular weight non-solvent, e. g. acetone, acetaldehyde, or mixtures of these various agents alone or with water.

The present invention has a number of advantages, one of which has been mentioned above; namely, that the solubility of the high molecular weight polymer in mineral lubricating oils is surprisingly improved or modified by the controlled chlorination treatment. Another advantage is that the chlorinated derivatives of this invention have the property of improving the viscosity index (viscosity-temperature relationship) of mineral lubricating oils to which they are added. Furthermore, the viscosity index improvement effected by blending these chlorinated derivatives in a lubricating oil base stock is generally substantially greater than the viscosity index improvement obtainable by the use of either the same amount of the corresponding unchlorinated compound or a sufficient amount thereof, to produce a lubricating oil blend having the same actual viscosity at a given temperature. A still further advantage of the present invention is that these chlorinated derivatives are quite stable, i. e., they have relatively little tendency to split off chlorine or hydrogen chloride.

The lubricating oils to which these chlorinated vinyl ether polymers are added may be natural or synthetic oils such as petroleum lubricating oils, fatty oils, or oils produced by the polymerization of olefins. Such oils may, for example, be waxy or dewaxed, improved by solvent extraction, acid or clay treatment or otherwise, residuals, pale oils, or light distillates. It is preferred to employ a hydrocarbon oil having a viscosity of about 35 to 500 Saybolt seconds at 210° F.

The additives of this invention may be incorporated in lubricating oil base stocks in conjunction with oxidation inhibitors, oiliness and extreme pressure agents, sludge dispersers, soaps, volatilized fatty or mineral compounds, pour inhibitors, dyes, colloidal materials such as graphite or zinc oxide, emulsifiers, resins, or the like.

The following examples illustrate some of the features of the invention:

EXAMPLE 1

A sample of polymerized vinyl oleyl ether having an average molecular weight of about 12,000 was chlorinated in carbon tetrachloride solution with actinic light at room temperature, to a chlorine content of 19.8%, and precipitated from solution by adding alcohol. This chlorinated polymer was blended in a paraffinic lubricating oil base stock, and the viscosities and viscosity indices of these blends and similar blends of the corresponding unchlorinated polymer were determined.

Table 1

| | Polymerized Vinyl Oleyl Ether | |
|---|---|---|
| | Unchlorinated | Chlorinated (19.82% Cl) |
| Percent of Polymer Added to Test Oil | Viscosity at 100° F. (Say. sec.) | |
| Blank-Oil A | 141 | |
| 1 | 161.8 | 153.2 |
| 3 | 206.7 | 184.2 |
| | Viscosity at 210° F. (Say. sec.) | |
| Blank-Oil A | 42.7 | |
| 1 | 44.9 | 44.0 |
| 3 | 50.5 | 47.5 |
| | Viscosity Index | |
| Blank-Oil A | 102 | |
| 1 | 114.4 | 111 |
| 3 | 132 | 124 |

The above data on the viscosities at 100° F. and 210° F. and the viscosity indices of the blends were plotted graphically in order to determine the viscosity indices of blends of the chlorinated and unchlorinated vinyl oleyl ether polymer having the same viscosities at 210° F. The data thus obtained are set forth in the following table:

Table 2

| Viscosity of Oil Blend at 210°F. (Say. sec.) | Polymerized Vinyl Oleyl Ether | | V. I. Superiority of Chlorinated Polymer Blend |
|---|---|---|---|
| | Unchlorinated | Chlorinated (19.82% Cl) | |
| | V. I. of Blend Having Viscosity Shown | | |
| 42.7 | 102 | | |
| 44.0 | 109.5 | 111 | 1.5 |
| 45.0 | 114.4 | 115.6 | 1.2 |
| 46.0 | 118.5 | 119.5 | 1.0 |
| 47.0 | 122 | 122.5 | 0.5 |

These data show that the chlorinated polymer, in spite of not having quite as good viscosity-improving characteristics as does the unchlorinated polymer, is unexpectedly somewhat superior to the unchlorinated polymer as regards the viscosity index-improvement obtainable for a given viscosity increase, e. g., at 210° F., by incorporating it in a mineral lubricating oil. This relationship is, of course, highly important from both technical and practical points of view.

Even better V. I. improvement is obtained with lower chlorine contents in the range of 1 to 10%.

EXAMPLE 2

The 1% blend of chlorinated, polymerized vinyl oleyl ether in oil A, as used in Example 1, was subjected to the A. S. T. M. pour test, and was found to have a pour point of −30° F., which corresponds to a pour point reduction (from the pour point of oil A) of 60°.

EXAMPLE 3

2% of the chlorinated polymerized vinyl oleyl ether used in Example 1 was dissolved in oil B (a paraffinic lubricating oil base stock having a V. I. of about 85 and a viscosity of about 40 sec. Saybolt at 210° F.), and the resulting blend was tested for load-carrying capacity on the Almen test machine. It carried 6 weights. Thus the chlorinated polymerized vinyl oleyl ether has some ability to increase the load-carrying capacity of a mineral lubricating oil, but this test indicates that the chlorinated polymer is fairly stable, and that its oil blends can be used as internal combustion engine crankcase lubricants without danger of serious corrosion troubles.

The chlorination derivatives of high molecular weight oxygen-containing polymers used according to the present invention as additives in lubricating oils, may also be converted into other derivatives, such as by ammonolyzing them to produce the corresponding amines or also replacement of the chlorine by polar groups, e. g., $NO_2$, $CN$, etc., which in turn may convert it into still further derivatives; and any of these derivatives made from the chlorination products used in this invention may also be used as addition agents in lubricating oils.

This application is a continuation-in-part of application Serial No. 372,180 (now abandoned), filed December 28, 1940, which is a continuation-in-part of application Serial No. 154,194 (now abandoned), filed July 17, 1937.

We claim:

1. A lubricant comprising a major proportion of waxy mineral lubricating oil and about 0.1 to 2% of a chlorinated polyvinyl oleyl ether containing about 10 to 25% of chlorine and having an average molecular weight of about 12,000.

2. A lubricant comprising a major proportion of a mineral oil having a viscosity of about 35 to 500 seconds Saybolt at 200° F., and a viscosity index-improving amount of about 1 to 10%, of a chlorinated polyvinyl oleyl ether having an average molecular weight of at least of about 12,000 and containing about 2 to 5% of chlorine.

RAPHAEL ROSEN.
WILLIAM J. SPARKS.

REFERENCES CITED

The following references are of record in the file of this patent:

UNITED STATES PATENTS

| Number | Name | Date |
|---|---|---|
| 2,079,783 | Wiezevich | May 11, 1937 |
| 2,123,641 | Wiezevich | July 12, 1938 |
| 2,186,916 | Wiezevich | Jan. 9, 1940 |
| 2,213,423 | Wiezevich | Sept. 3, 1940 |

FOREIGN PATENTS

| Number | Country | Date |
|---|---|---|
| 497,782 | Great Britain | Dec. 28, 1938 |